Jan. 7, 1958   H. G. TWIFORD   2,818,913
PERIPHERAL COMPRESSION TYPE TIRE BEAD SEATING DEVICE
Filed March 28, 1955
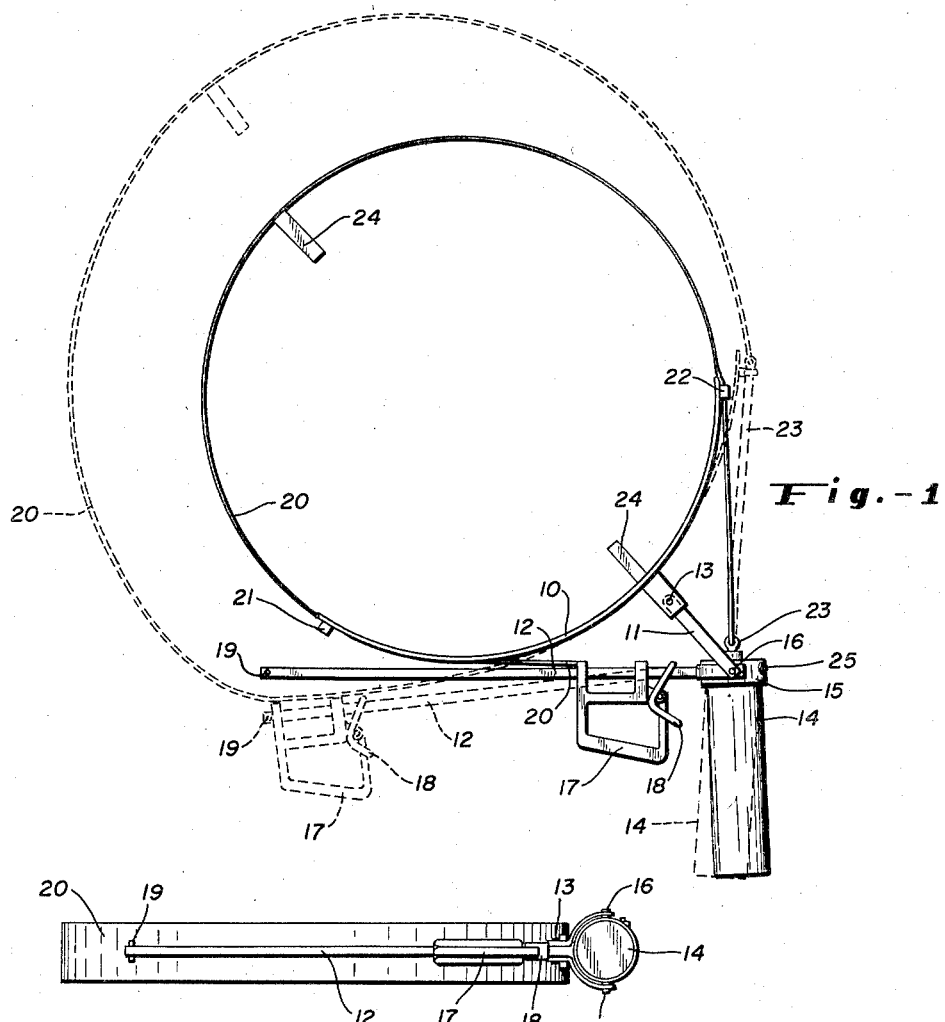
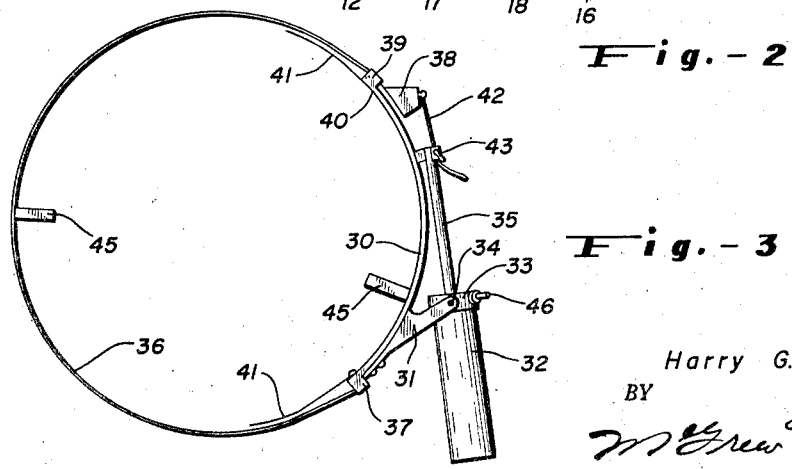
INVENTOR.
Harry G. Twiford
BY
ATTORNEYS

United States Patent Office 2,818,913
Patented Jan. 7, 1958

2,818,913
PERIPHERAL COMPRESSION TYPE TIRE BEAD SEATING DEVICE

Harry G. Twiford, Denver, Colo.

Application March 28, 1955, Serial No. 497,185

3 Claims. (Cl. 157—1.21)

This invention relates to bead expanders, and more particularly to motor vehicle tire bead expanders for expanding the beads of such tires and forcing them into intimate contact with the bead grooves in the rim of a vehicle wheel.

The introduction of tubeless tires has greatly increased the labor of mounting and dismounting pneumatic tires on vehicle wheels. For example, in mounting tubeless tires on a wheel the tire beads must be made to tightly engage the accommodating grooves of the wheel rim so that air introduced into the tire may be retained and the tire inflated. Merely placing the tire on the wheel rim does not automatically place the beads into correct, intimate contact with the corresponding rim grooves. The usual practice is to remove the tire and wheel from the mounting stand and bounce it until the beads pop into the groove, after which the tire may be inflated. This procedure is, obviously, unsatisfactory and is not desirable.

The expander of the present invention comprises, in general, a band for circumscribing the tread of a vehicle tire and a means for decreasing the peripheral length of the band. The encompassing band is contracted to squeeze a rubber tire and force the beads into the accommodating grooves on the rim of the vehicle wheel. The expander includes a shoe which provides a base for holding and contracting the band thereagainst in the squeezing of the tires. Since vehicle tires are not all the same diameter, means are provided for initially adjusting the band to snugly circumscribe the tire on which it is being used, and power take-up means are then provided to contract the band forcibly squeezing the tire. Guide members are provided for correctly placing the expander on the tire.

In one preferred embodiment of the device, an air cylinder is utilized as the power take-up means for contracting the band. Since air must be available to inflate the tire, the air cylinder provides an effective and easy method of expanding the beads of the tire.

Included among the objects and advantages of the present invention is a bead expander for rubber vehicle tires for quickly and easily forcing the tire beads into their accommodating grooves in the rim of the vehicle wheel. The device is adjustable so that it may accommodate substantially all small truck and passenger vehicle tires in current use. The device is simple to operate and easily forces the beads of the tire into the wheel grooves without damage to the tire. Guide means are provided for positioning the expander in correct position on the tread of the particular vehicle tire.

These and other objects and advantages of the invention will be readily ascertained by referring to the following description and appended drawings, in which:

Fig. 1 is a top plan view of one form of the invention illustrating the open and closed position of the device;

Fig. 2 is a side elevation of the device of Fig. 1; and

Fig. 3 is a modified form of the bead expander according to the invention.

In the device illustrated in Figs. 1 and 2, a shoe member 10, which is sufficiently long to contact only a portion of the tread of a retained tire, has a pivot bracket 11 mounted thereon by a pivot 13. The shoe 10 is sufficiently resilient to permit it to evenly contact the periphery of common sizes of tires, and it is sufficiently rigid to hold the air cylinder and permit the band to be squeezed on a tire. An adjusting rod 12 is rotatably secured, along with bracket 11, to the cap 15 of an air cylinder 14 by a pivot 16. The cylinder is held by the pin 16 so that it is free to rotate through a small arc, as indicated by the dashed lines 14, to accommodate the movement of its piston 23 on expanding and contracting the band 20. An adjusting handle 17 is reciprocally mounted on adjusting rod 12. A release lever 18 provides means for moving the adjusting handle from a position adjacent the bracket 11 to a stop pin 19 at the outermost end of the rod 12. The adjusting handle 17 is arranged to permit the handle to be moved toward the cylinder 14 without releasing lever 18, but the adjusting handle cannot be moved outwardly toward the stop pin 19 without tripping the lever 18. A flexible, thin metal band 20 is secured to the adjusting handle 17, and a guide 21, mounted on the end of the shoe 10, holds the band immediately adjacent the end of the shoe. The band 20 passes through guide 21 around to another guide 22 on the opposite end of the shoe 10. The other end of the band is inter-connected with a piston 23 of the air cylinder 14. In extended position, shown in the dashed line 23, the piston holds the band 20 in open position, shown by dashed lines 20, and when retracted into the cylinder, shown by the solid line 20, the band is drawn to its smallest diameter. Placement guides 24, which are thin strips of metal welded or otherwise secured to the band and to the shoe, hold the apparatus in place on a tire which it encircles.

In operation, the apparatus is placed over a held tire so that the band 20 encompasses the tread of the tire. Normally, the adjustment handle 17 is moved to the stop pin 19 and the piston 23 is in full extended position prior to placing the expander around a tire. The placement guides 24 hold the apparatus in place on the tire. The adjusting handle 17 is moved from the outermost position against stop 19 inwardly to the point where the band fits snugly on the periphery or the tread of the tire. A conventional service station air hose is used to provide activating air for the power cylinder, and the compressed air is introduced into the cylinder through an inlet 25. The piston 23 of the air cylinder 14 is, thereby, moved from its extended position, indicated by dashed lines 23 in Fig. 1, to its retracted position, indicated by the solid lines 23, decreasing the peripheral length of the band and squeezing the tire therein. On squeezing the tire, the beads are forced outwardly into intimate contact with the corresponding grooves of the rim of the vehicle wheel. Air is then introduced into the tire in a sufficient quantity to retain the beads in the grooves. The air is released from cylinder 14 and the expander removed. Under normal circumstances, the cylinder should be of the type that on releasing the air from the cylinder the piston 23 may be easily pulled to its extended position, dashed lines 23. This provides an expander which is utilized with minimum effort, so that it may be readily withdrawn from the tire without further manipulation. A very simple, inexpensive air cylinder may be used for the device. Application of compressed air to the cylinder quickly reduces the peripheral length of the band against the tire, squeezing the tire and forcing the tire beads outwardly, so that the entire operation is performed in a matter of seconds.

In the modified form, illustrated in Fig. 3, a shoe 30, which contacts only a minor portion of the periphery of a tire, has a shoe bracket 31 mounted thereon. An air cylinder 32 is mounted, by its cylinder cap 33, onto the shoe bracket by means of pins 34. A reciprocal cylinder piston 35 completes the piston assembly. A metal band 36 is secured by one end to end 37 of the shoe 30 and the opposite end of the band is secured to a block 38; the band passing through a band guide 39 on an end 40 of the shoe 30. Shoe extensions 41 are provided on ends 37 and 39 to permit the band to slide freely around the tire. A belt or webbing 42 is secured by one end to block 38 and the other end passes through a slide buckle 43 which is secured to the outer end of the piston 35. A slide buckle 43 provides a lock means for freely drawing the belting through toward the piston to initially adjust the band on a tire. The buckle, however, must be released to permit the belt to slide away from the cylinder and open the band. Placement guides 45 are secured to the band and to the shoe 30 to provide means for holding the band in place on a tire. A valve 46 on the air cylinder provides means for admitting and releasing air from the cylinder 32.

In use, the belt 42 is released to provide maximum length thereof, and the piston 35 is extended to its maximum extension out of the cylinder 32, similar to the action of piston 23. The band 36 is then placed over a tire and the belt 42 is pulled up to make the band a snug fit on the tire. Air is introduced into valve 46, pulling the piston 35 into the cylinder, decreasing the length of the band, and squeezing the tire therein. On releasing the air from the cylinder, the piston 35 extends opening the band so that it is readily removed from the tire.

The device has been illustrated utilizing a metal band as the peripheral squeezing member of the device, however, other types of bands may be utilized in place of the metal band. For instance, webbing or a webbed belt may be utilized in place of the metal strip; the same general results being obtained, that is, squeezing the tire. The metal strip, however, provides an easily handled device on which placement guides may be utilized for quickly and easily adjusting the bead expander into position on a tire. With belting it is obvious that it must be manually held in place until the squeezing pressure holds it on the periphery of the tire. A lever or screw or other power means may be utilized in place of the air cylinder for applying power to quickly reduce the peripheral length of the band on the tire. However, since air must be used to inflate the tire, an air hose must, obviously, be handy, and the air cylinder provides an efficient and effective means for applying power for squeezing the tire. The air cylinder is economical, fast, and does not require additional labor.

While the invention has been described in relation to specific devices, there is no intention to limit the scope thereof to the precise details so illustrated, except insofar as set forth in the following claims.

I claim:

1. Apparatus for spreading the beads of a rubber tire comprising a resilient shoe adapted to conform with the periphery of a held tire, said shoe extending a minor distance around the periphery of said tire, a thin, flexible band secured to one end of said shoe and extending the remaining distance around said tire, an air cylinder interconnected with said shoe, the opposite end of said band being interconnected with the piston of said cylinder for quickly and forcibly reducing the peripheral length of said band in contact with said tire so as to squeeze an encircled tire, band guide means on the opposite end of said shoe for holding said band thereon, and take-up means between the end of said band and said piston for initially adjusting the peripheral length of said apparatus.

2. Apparatus according to claim 1 in which the take-up means is a web strap and buckle.

3. Apparatus according to claim 1 in which the take-up means is a web strap which is secured between the end of said band and a one way free sliding buckle mounted on the end of said piston.

References Cited in the file of this patent
UNITED STATES PATENTS

| | | |
|---|---|---|
| 734,512 | Christopher | July 28, 1903 |
| 1,104,579 | Thorsby | July 21, 1914 |
| 1,597,926 | Seifert | Aug. 31, 1926 |
| 1,966,580 | Bull | July 17, 1934 |
| 2,684,112 | Coats | July 20, 1954 |